Jan. 30, 1945.　　　　　L. ROSENSTEIN　　　　　2,368,600
GAS PURIFICATION AND SEPARATION PROCESS
Filed Jan. 24, 1942
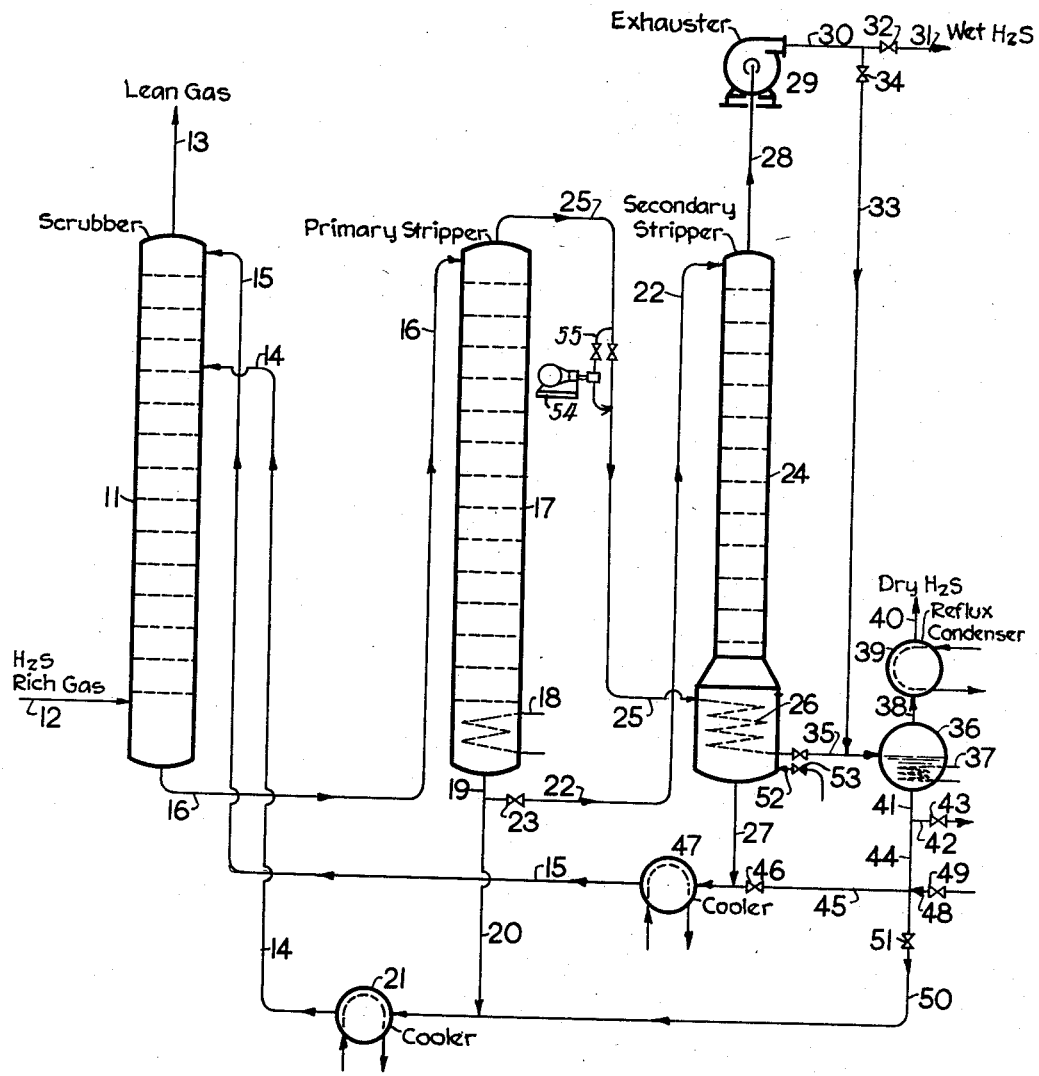
Inventor: Ludwig Rosenstein
By His Attorney:

Patented Jan. 30, 1945

2,368,600

UNITED STATES PATENT OFFICE 2,368,600

GAS PURIFICATION AND SEPARATION PROCESS

Ludwig Rosenstein, San Francisco, Calif., assignor to Shell Development Company, San Francisco, Calif., a corporation of Delaware Application January 24, 1942, Serial No. 428,100

5 Claims. (Cl. 23—2)

This invention relates to a process for the separation of absorbable impurities from a fluid by contacting it with a heat regenerable absorbent solution for said impurities. The absorbent solution employed in this invention is a solvent-solute combination wherein the solute removes the impurities and part of the solvent vaporizes to aid in the regeneration of the absorbent solution. More particularly, this invention deals with an improvement in the process for removing gaseous impurities such as $H_2S$, HCN, $CO_2$, etc., from hydrocarbon liquids or gases, by scrubbing such hydrocarbons with an alkaline solution, such as aqueous $Na_2CO_3$, aqueous $K_3PO_4$, or the like (wherein the salt is the solute and the water is the solvent) and then regenerating the resulting spent solution by heating to vaporize part of the solvent in the solution.

It is known that gaseous impurities have been removed from fluids by contacting the latter with absorbent solutions to produce a spent or fat solution which is then regenerated by heat to yield a lean solution for further use in the process. In processes of this type the greatest operating expense normally resides in the amount of heat required for the regeneration of the absorbent.

A purpose of this invention is to increase the efficiency of such a process by reducing the amount of heat required for the regeneration of the absorbent solution, or by removing more impurity from a fat solution with a given amount of heat. Another purpose is to regenerate the fat solution in two stages, the second stage being at a lower pressure than the first. A further purpose is to achieve a greater efficiency by stripping only a portion of the fat solution under a reduced pressure.

According to this invention, fat absorbent solution resulting from contacting a fluid containing absorbable impurities with lean absorbent solution, is stripped in a primary stripper by the heated vapors of the solvent in the absorbent solution to produce a primary lean solution and vapors. A minor portion of this primary lean solution is then further stripped in a secondary stripper to produce a secondary lean solution and vapors. The vapors from the primary stripper indirectly heat the secondary stripper, which latter is maintained at a pressure substantially lower than that of the primary stripper. The remaining major portion of the primary lean solution is introduced into a first scrubbing zone of the scrubber, while the secondary lean solution is introduced into a final scrubbing zone. Further, the secondary lean solution may be diluted with the solvent condensed from the vapors from both strippers before being introduced into the scrubber.

It has been found that the stripping or the regeneration of fat absorbent solution at reduced pressures is more efficient and requires a smaller amount of heat per amount of impurities stripped than is required at higher pressures. The following table clearly illustrates this, which table shows the concentrations of hydrogen sulfide in steam maintained in equilibrium with boiling "fat" tripotassium phosphate solution at four different pressures.

*Equilibrium distribution of hydrogen sulfide between tripotassium phosphate solution and steam at boiling temperature*

| | Stripping pressures | | | |
|---|---|---|---|---|
| | 31 mm. (.041 atm.) | 760 mm. (1.0 atm.) | 3.7 atm. | 33.3 atm. |
| Mols of $K_3PO_4$/kg. solution | 1.95 | 1.95 | 1.95 | 2.00 |
| Mols $H_2S$/mol $K_3PO_4$ | .667 | .667 | .667 | .772 |
| Mols $H_2S$/mol $H_2O$ in vapor | .05 | .022 | .0082 | .0027 |

These data show that, for the same amount of hydrogen sulfide in the absorbent solution, over twice as much hydrogen sulfide can be stripped out with the same amount of steam at .041 atm. pressure as at one atmosphere, and six times as much as at 3.7 atms. pressure, etc. From the above, it would appear that stripping should be conducted at as low a pressure as can conveniently be obtained, preferably under high vacuum. However, this has the disadvantage that it becomes necessary to handle large amounts of vapors with vacuum pumps, which is expensive. The method of this invention is capable of achieving substantially the same advantages without requiring the handling of the large amounts of vapors through exhaust pumps.

The process of this invention comprises three main steps: (I) scrubbing a fluid containing vaporizable impurities with two separated portions of an absorbent solution which have been regenerated to varying degrees of concentration; (II) regenerating the resulting fat absorbent solution in a primary stripper whereby the major portion of the absorbed impurities is removed; and (III) further regenerating a minor portion of the resulting stripped solution in a secondary stripper maintained at a lower pressure than the primary stripper and heated by the vapors emanating from the latter.

The following detailed description, limited to a specific embodiment disclosed in the accompanying drawing, is illustrative of the process. This drawing represents a flow diagram of this process wherein a hydrocarbon gas containing hydrogen sulfide and/or analogous acidic impurities is scrubbed in a scrubber with an absorbent solution to produce a fat solution, and wherein the latter is regenerated by steam stripping.

The scrubbing step (I) is carried out in the scrubber 11 which is provided with: an intake 12 at its bottom for the hydrocarbon gas rich in hydrogen sulfide and/or analogous acidic impurities; a vapor outlet line 13 at its top for the hydrocarbon gas which has had substantially all its acidic impurities removed; inlet lines 14 and 15 in its side, for the primary and secondary lean absorbent solutions, respectively (line 15 being above line 14); and outlet 16 at its bottom for the fat absorbent solution. The secondary lean solution is more diluted than the primary, as will be explained later. The two solutions combine as they flow down in countercurrent to ascending gas through the scrubber to form a single fat absorbent solution.

The primary regenerating step (II) is carried out in the primary stripper 17 wherein the fat absorbent solution obtained from the scrubber 11 is stripped. This fat solution passes through line 16 from the bottom of scrubber 11 to the top of the primary stripper which is provided with: a reboiler 18 at its bottom in which any heat transfer medium such as hot oil, steam or the like, may be employed; a vapor outlet line 25 at its top for a primary vapor; and an outlet line 19 at its bottom for a primary lean solution. The vaporized solvent produced in reboiler 18 strips the descending solution, thereby resulting in said primary vapor and lean solutions. In line 19 the latter is divided into two unequal portions. The larger portion returns through line 20, cooler 21 and line 14 into the side of scrubber 11 at a point intermediate to the top and bottom. The smaller portion of said primary lean solution passes through line 22 and pressure regulator valve 23 into the top of the secondary stripper 24 for further regeneration. The amount of this minor portion is limited to that which, when further regenerated and preferably diluted as described later, will be sufficient for the final scrubbing of the hydrocarbon gas in the scrubber.

The second regenerating step (III) for the minor portion of the lean solution is carried out in the secondary stripper 24 wherein is produced a secondary highly regenerated lean solution and a secondary vapor. This vapor contains substantially the same ingredients as the primary vapor, namely acidic impurities and vaporized solvent. The secondary stripper 24 is provided with: a heating coil 26 in its bottom (through which the primary vapors from the primary stripper pass by means of line 25) to indirectly heat and strip said minor portion of said primary lean solution; an outlet line 27 at its bottom for the secondary lean solution; and a vapor outlet line 28 at its top for the secondary vapor. The secondary vapor is conveyed through line 28 by means of an exhauster or vacuum pump 29 which reduces the pressure in the secondary stripper substantially below that pressure maintained in the primary stripper. The pressure in the secondary stripper 24 is preferably maintained below atmospheric. The vapor from the exhauster 29 passes through line 30 and may be discarded through line 31 and valve 32, but preferably is returned through line 33 and valve 34 to join the primary vapor in line 35 from the heat transfer coil 26 before entering the separator 36.

The amount of heat transferred to the lean solution in the secondary stripper (through the coil 26) depends upon the surface area of the coil, the rate of flow of the primary vapor through said coil, and the difference in the pressures between the primary and the secondary stripper, which difference controls the temperature differential between the strippers. Since only a relatively small portion of the absorbent solution need be diluted for the final scrubbing of the hydrocarbon gas, a relatively small capacity secondary stripper is sufficient for this secondary stripping, which requires an exhauster of small capacity only in step (III).

The acidic impurities and the vaporized solvent from both the primary and secondary strippers may be collected in the separator 36 wherein the impurities are separated from the solvent. The separator 36 is provided with: a heating coil 37 to maintain the temperature therein at the boiling temperature of the solvent; an outlet line 41 at the bottom of the separator for the solvent which accumulates therein; and a vapor outlet line 38 at its top connected to a reflux condenser 39 which condenses the solvent in the vapors and returns it to the separator, permitting the dry acidic vapors to be withdrawn through line 40. The solvent withdrawn through line 41 may be discarded through line 42 and valve 43; or preferably it may be returned to the system through lines 44 and 45 and valve 46 to join the secondary lean solution in line 27 before passing into the cooler 47 and returning to the final scrubbing zone at the top of the scrubber 11 through line 15. If this solvent is not returned to the system, fresh solvent may be introduced into line 45 through line 48 and valve 49 from an outside source at suitable intervals or continuously to maintain predetermined optimum concentrations of the absorbent solutions. A line 50 and valve 51 are provided so that the solvent condensed from the strippers may if desired also be added to the primary lean solution in line 20. If an aqueous alkaline absorbent solution is employed in this illustrative process the solvent referred to above is water.

Live steam line 52 with valve 53 is connected to the bottom of the secondary stripper 24 so that additional steam and heat may be added, if an aqueous absorbent solution is employed, to aid the secondary stripping operation.

While one embodiment of this invention has been described, it shall be understood that additional heat exchangers, coolers, valves, pressure regulators, by-pass lines, pumps, compressors and other equipment may be interposed at one or several points in the system so as to permit exercise of heat economy and control of the temperatures and pressure employed; such as, for example, if a pressure differential is maintained between the scrubber and the separator, additional pressure regulating apparatus (not shown) must be employed in the lines connecting these units. The installation of such devices is considered to be within the skill of the ordinary plant designer acquainted with the operation of such devices.

The particular apparatus shown in the drawing may be modified in two general ways without departing from the present invention. One involves placing the primary stripper 17 under superatmospheric pressure so as to produce a greater pressure drop between the primary and secondary strippers. The other involves the use of a compressor 54 in valved line 55 by passing valved line 25 to increase the heat available for transfer in the coil 26 from the primary vapor to the secondary lean solution. However, the embodiment shown with the exhauster 29 connected to the secondary vapor line 28 at the top of the secondary stripper has been found to be the most economical and preferred embodiment to maintain the secondary stripper under a subatmospheric pressure.

It has been found advantageous to give a fluid containing a weak acid its final scrubbing with a relatively dilute solution rather than with a concentrated solution because the partial pressure of hydrogen sulfide or a similar weak acid increases with a rise in concentration of the absorbent for constant ratios of the weak acid to the absorbent in the solution. Accordingly, the secondary lean solution is diluted before being introduced into the final scrubbing zone of the scrubber.

The fluids which may be scrubbed in a process of the type involved herein may be gaseous or liquid. They must be inert under the conditions of the process, and the liquid must be immiscible with the scrubbing or absorbent solution. Some of the particular fluids which contain absorbable impurities and are purified by the process of this invention are natural gas, refinery gas, coke oven gas, smelter gas, generator gas and other manufactured gases; various liquefiable or normally liquid hydrocarbons such as propane, butanes, pentanes, hexanes, benzene, natural gasoline, low boiling gasoline fractions, gasoline distillates, kerosene distillates; normally liquid chlorinated hydrocarbons such as carbon tetrachloride, ethylene dichloride, etc.; fatty oils, essential oils, and the like.

The impurities present in these fluids may be acidic, basic or neutral, but to be removable by the process of this invention they must be vaporizable at or below the boiling temperature of the solvent in the particular absorbent solution employed. Some of these impurities are $H_2S$, $CO_2$, CO, HCN, $SO_2$, HCl, $SO_3$ mercaptans, phenol, $NH_3$, and the like.

The absorbent solutions employed in the process of this invention produce chemical reactions to neutralize or to form complex salts with the impurities, which chemical reactions are reversed by heating. Some specific absorption solutions which may be used in absorbing some of the impurities above mentioned include solutions of the following compounds: $K_3PO_4$, $Na_2CO_3$, $K_2CO_3$, sodium borate, NaOH, $ZnSO_4$, $CuCl_2$, quinoline, aniline, organic hydroxy amino bases such as mono, di- and tri-ethanol amine or mixtures thereof, diamino isopropanol; aryl amines such as phenylene diamine, tetra-amino naphthalenes, diamino tetra-hydroxy naphthalenes; aryl alkyl amines such as phenyl ethyl diamine or methyl meta diamine; piperidine or its homologues; piperazine; and the like. Mercaptans are generally removed with aqueous solutions of alkali metal hydroxides. It has been found that aqueous alkaline absorbent solutions are desirable for removing acidic impurities from light hydrocarbon liquids or gases having dissociation constants smaller than $10^{-6}$.

In the multiple stream scrubbing operation involved in the process of this invention, the ratio between the amounts employed in the different streams of lean absorbent solution divided at the bottom of the primary stripper may vary within wide limits. For example, the portion divided for further stripping may vary between about 1% and about 20% of the whole lean solution, but normally about 5%.

The concentration of the absorbent in the absorbent solutions after the absorbent solutions have combined in the scrubber may vary within wide limits, depending upon various operating conditions as well as the type of absorbent used. Normally, for the combined stream it is good practice to employ a concentration of absorbent approximately equal to that which would give the best results in a single stream operation process under the same particular set of conditions. The concentration of the diluted and undiluted portions of the lean absorbent solution will then depend upon the amount of solvent vaporized and condensed, and the ratio of the two portions. The amount of solvent vaporized is controlled by the desired thoroughness of the stripping operations. Too, it is evident that the optimum concentration of the diluted portion also may vary within wide limits. Thus, when removing the impurities with a suitable absorbent solution, it has been found that dilute solutions containing between .1 and 1.5 mols of the absorbent solute per kilogram have been effective. However, in the specific case of mercaptan removal, with alkali metal hydroxide, the dilute solution may contain as much of the absorbent as two mols per kilogram.

In the scrubbing operation, a superatmospheric pressure enhances the solubility of some absorbable impurities, such as, for example, hydrogen sulfide, carbon dioxide, and the like in aqueous alkaline absorbent solutions. It is possible, nevertheless, to realize the advantages of the process of this invention at lower stripping pressures, such as atmospheric pressure.

In general, the lower the temperature the more soluble are the impurities in the absorbent solution for a given pressure. Therefore, it is usually preferable to carry out the scrubbing operation at as low a temperature as is practical. It is further possible to control the amount of impurities removed by the scrubbing operation by varying the flow rates for any given fluid to be extracted with a given absorbent.

The apparatus may be of any conventional or convenient structure or design as long as it will safely permit the use of the pressures, temperatures and rate of flow necessary for effecting the process of this invention. In many cases the rather expensive plate stripper may be replaced by relatively inexpensive reboilers because of the high efficiency of a multiple stream scrubbing process. In maintaining the reduced pressure on the secondary stripper, a suitable exhauster or vacuum pump is required which may be either of the mechanical or aspirator type such as a barometric condenser.

I claim as my invention:

1. In a process for separating vaporizable impurities from a fluid wherein said fluid is contacted in a scrubber with a heat regenerable absorbent solution to produce a fat solution containing said impurities and wherein said absorbent solution contains a solute which removes said impurities and a solvent which vaporizes above the boiling temperature of said impurities, and further wherein said fluid is separated from said fat solution and the latter is regenerated for further scrubbing of said fluid, the improvement comprising regenerating said fat solution in a primary stripper to produce a primary lean solution and primary vapors which latter contains vapors from said solvent and of said impurities, further regenerating a portion of said primary lean solution in a secondary stripper under a pressure substantially less than that employed in said primary stripper in indirect heat exchange with said primary vapors at a pressure greater than that in said primary stripper to produce a secondary lean solution and secondary vapors, which latter also contains vapors from said solvent and of said impurities, cooling the vapors from both strippers to produce a condensed solvent and a vapor containing said impurities, separating the solvent from the vapor of said impurities, adding the solvent to the secondary lean solution and introducing said lean solutions into said scrubber in a manner such that said fluid contacts first the primary and then the secondary lean solution.

2. The process of claim 1 wherein the pressure in the secondary stripper is subatmospheric.

3. The process of claim 1 wherein the vaporizable impurities in said fluid are acidic impurities in a hydrocarbon fluid, are vaporizable at the boiling temperature of water, and have a dissociation constant smaller than $10^{-6}$ and wherein the absorbent solution is an aqueous alkaline solution.

4. The process of claim 1 wherein the cooling of the vapors from both strippers is effected in a separator maintained at a temperature above the boiling temperature of said impurities and below the boiling temperature of said solvent.

5. The process of claim 1 wherein the vaporizable impurities are hydrogen sulfide and analogous acidic impurities in a hydrocarbon fluid and wherein the absorbent solution is an aqueous tripotassium phosphate solution.

LUDWIG ROSENSTEIN.